United States Patent
Diaz et al.

(10) Patent No.: US 7,952,025 B2
(45) Date of Patent: May 31, 2011

(54) SWITCHBOARD BUS ASSEMBLY IN WHICH MATERIAL REQUIREMENTS ARE REDUCED WITHOUT REDUCING PERFORMANCE

(76) Inventors: Mauricio Diaz, Apodaca (MX); Luis Islas, Apodaca (MX)

( * ) Notice: Subject to any disclaimer, the term of this patent is extended or adjusted under 35 U.S.C. 154(b) by 271 days.

(21) Appl. No.: 12/346,712

(22) Filed: Dec. 30, 2008

(65) Prior Publication Data

US 2010/0163268 A1 Jul. 1, 2010

(51) Int. Cl.
*H01R 4/60* (2006.01)
(52) U.S. Cl. .............. 174/68.2; 174/70 B; 174/88 B; 174/71 B; 174/72 B; 361/611; 439/213
(58) Field of Classification Search ............ 174/68.2, 174/68.3, 70 B, 71 B, 72 B, 88 B, 99 B, 129 B, 174/133 B, 149 B; 361/600, 611, 621; 439/212, 439/213, 517
See application file for complete search history.

(56) References Cited

U.S. PATENT DOCUMENTS

| | | | | |
|---|---|---|---|---|
| 2,318,859 | A * | 5/1943 | Huguelet | 248/68.1 |
| 5,101,080 | A * | 3/1992 | Ferenc | 174/68.2 |
| 6,040,976 | A | 3/2000 | Bruner et al. | |
| 6,870,103 | B1 | 3/2005 | Wiant et al. | |
| 2004/0100785 | A1 | 5/2004 | Josten et al. | |
| 2006/0121796 | A1 | 6/2006 | Josten et al. | |

FOREIGN PATENT DOCUMENTS

DE 102005047687 A1 3/2007

OTHER PUBLICATIONS

XP-002585431, "Extra losses caused in high current conductors by skin and proximity effects", A. Ducluzaux, Cahier Technique Schneider Electric No. 83, Dated Jan. 1983, 22 pages.
XP-002585432, Effect of Busbar Arrangements on Rating, URL:www.cooperinfo.co.uk/busbar/pub22-cooper-for-busbars/sec5.htm>, Dated 1996, 8 pages.
XP-002585433, Effect of Busbars Arrangements and Profiles on the Total Power Losses, S.J. Kulas, Warsaw University of Technology, Poland, Dated 2005, 14 pages.
International Search Report Application PCT/US2009/066952, Date Jun. 6, 2010, 4 pages.
International Written Opinion Application PCT/US2009/06695, Date Jun. 6, 2010, 5 pages.

* cited by examiner

*Primary Examiner* — Dhiru R Patel

(57) ABSTRACT

A bus system for use in electrical distribution equipment includes a generally U-shaped arrangement of conductors for supplying very high amperage (e.g., above 2000 amps) alternating current to the electrical distribution system. Compared to prior-art conductor arrangements, using the present arrangement, the conductors of a phase can be fabricated from less copper, which is an expensive metal. They also achieve better thermal dissipation and current distribution and mitigate skin effects. As a result, resistive losses, which increase with increased temperature, are reduced.

20 Claims, 5 Drawing Sheets

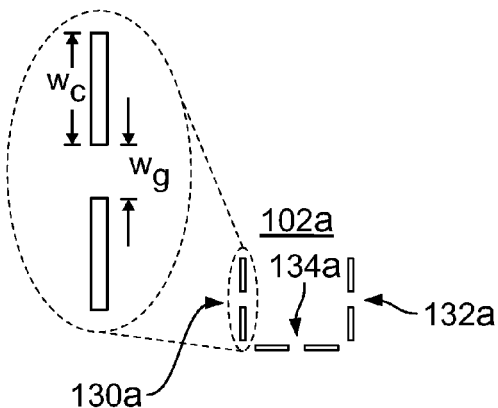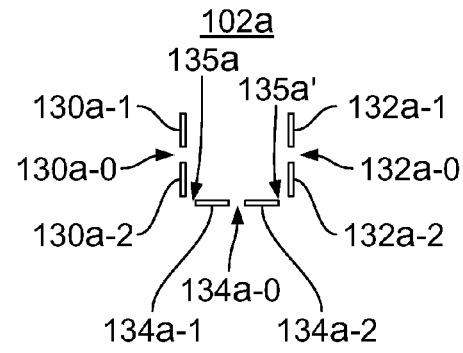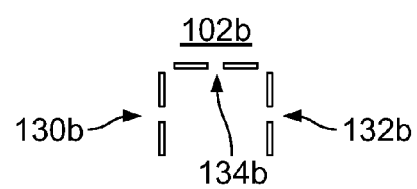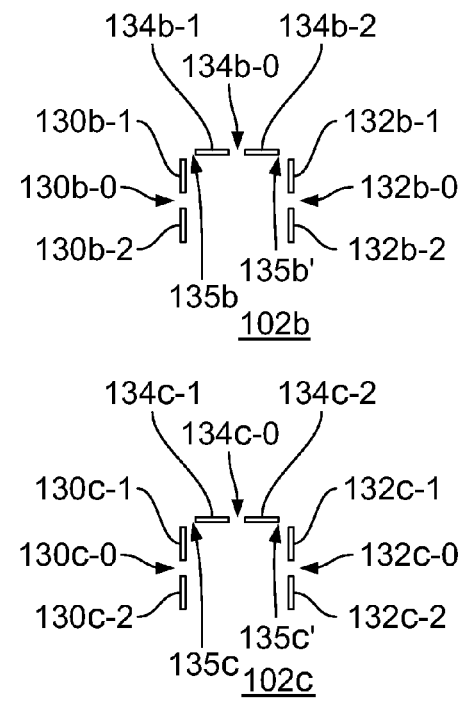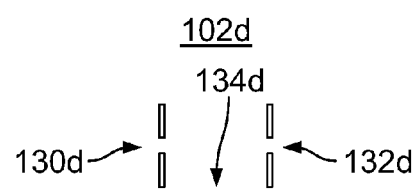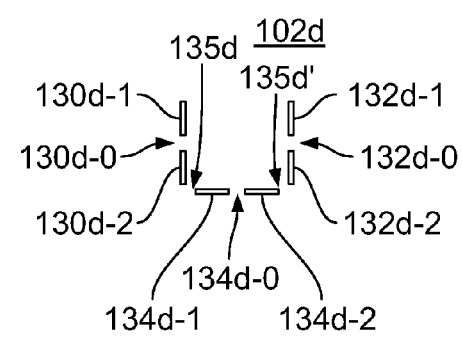
FIG. 4A  FIG. 4B

SWITCHBOARD BUS ASSEMBLY IN WHICH MATERIAL REQUIREMENTS ARE REDUCED WITHOUT REDUCING PERFORMANCE

FIELD OF THE INVENTION

The present invention relates generally to bus systems, and in particular, to switchgear bus systems for electrical power distribution.

BACKGROUND OF THE INVENTION

Electrical distribution equipment, including switchboards, switchgear, and motor control centers, use conductors to connect circuit breakers and other protection equipment to loads. Existing conductors include one or more flat conductors depending upon the desired current rating or ampacity of the distribution equipment. As the length of these conductors increases, the temperature of the surrounding air due to natural convection increases, resulting in poor thermal dissipation and current distribution. In the case of flat conductors, to counteract the adverse thermal effects, additional flat conductors are stacked together, but at the cost of an increase in the amount of expensive copper. For example, a cross-sectional view of a portion of a known bus system is shown in FIG. 5A. Four laminated conductors 501, 502, 503 and 504 are used per bus, each laminated conductor having two conductors for a total of eight conductors (501a, 501b, 502a, 502b, 503a, 503b, 504a and 504b) per bus.

A related problem is a phenomenon called the "skin effect," which holds that the current density near the surface of the conductor is greater than at its core. Because of increased conductor volume, laminated flat conductors exhibit relatively poor current distribution due to the skin effect. Moreover, in multi-phase systems, adjacent conductors of different phases are subjected to another undesirable phenomenon called the "proximity effect," which relates to how current flowing through one phase interferes with current flowing through an adjacent phase. As a result of the proximity effect, current tends not to be distributed evenly throughout the conductor cross-section, but rather tends to crowd to the side closest to a conductor of an adjacent phase. As a result, some portions of conductors of one phase can get hotter than other portions of the same or different conductor in the same phase, resulting in uneven current distribution within the conductors composing a conducting phase.

Overview

Aspects of the present disclosure are directed to a bus system for use in electrical distribution equipment that includes a generally U-shaped arrangement of conductors for supplying very high amperage (e.g., above 2000 amps) alternating current to the electrical distribution system. Compared to prior-art conductor arrangements, using the present arrangement, the conductors of a phase can be fabricated from less copper, which is an expensive metal. They also achieve better thermal dissipation and current distribution and mitigate skin effects, thereby reducing power losses. In general, power losses are reduced when current distribution and conductor temperature are made more uniform, eliminating "hot spots," which increase resistance of the conductor.

A particular aspect of the present disclosure also mitigates proximity effects on the conducting phases. Proximity effects relate to the undesired tendency of current to favor the conductor surface proximate an adjacent phase conductor, resulting in uneven current distribution within the phase conductor and uneven heating of the conductors. Skin effects exacerbate this proximity-effect phenomenon, because electrical current already prefers to distribute itself at the surface of the conductor. Strategic positioning of the U-shaped buses of adjacent phases helps mitigate proximity effects and increase the overall efficiency of the conductors by promoting a more uniform and symmetrical current density within the conductors.

The use of single-thickness (as opposed to double-thickness) conductors leads to improved thermal dissipation and a reduction in skin effects. As a result of the improved thermal dissipation and the reduction in skin effects, the overall amount of copper or other conductive material needed for the conductors to support the same current rating as prior-art conductors is significantly reduced.

The present U-shaped bus, in which additional conductors are present in the closed area of the U, exhibits greater surface area than comparable known bus systems. Greater bus surface area also improves thermal dissipation.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 4A and FIG. 4B are cross-sectional views of the bus system of FIG. 1;

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
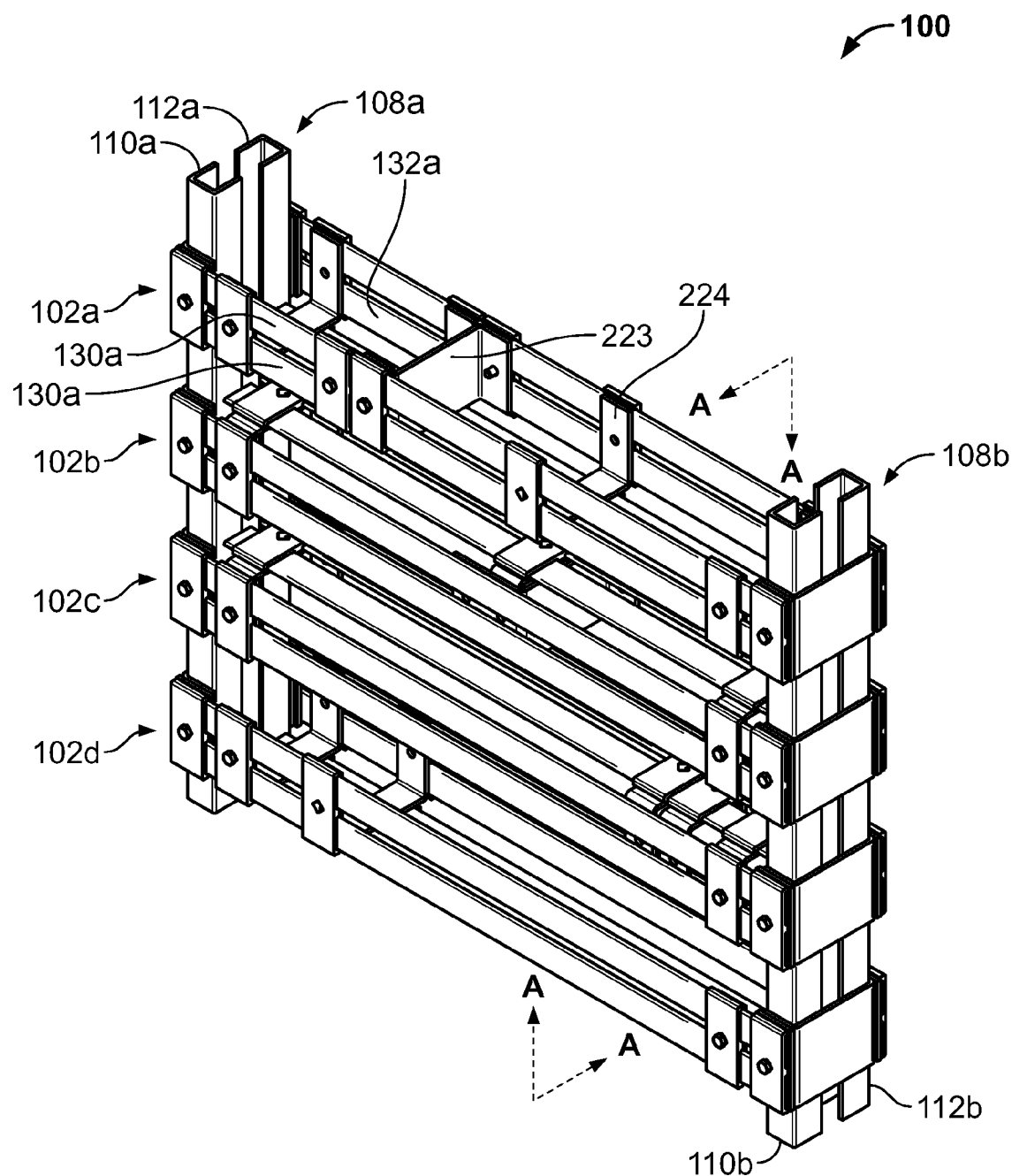
FIG. 1 is an isometric view of a bus system having approximately U-shaped horizontal conducting phases.
Figure 2:
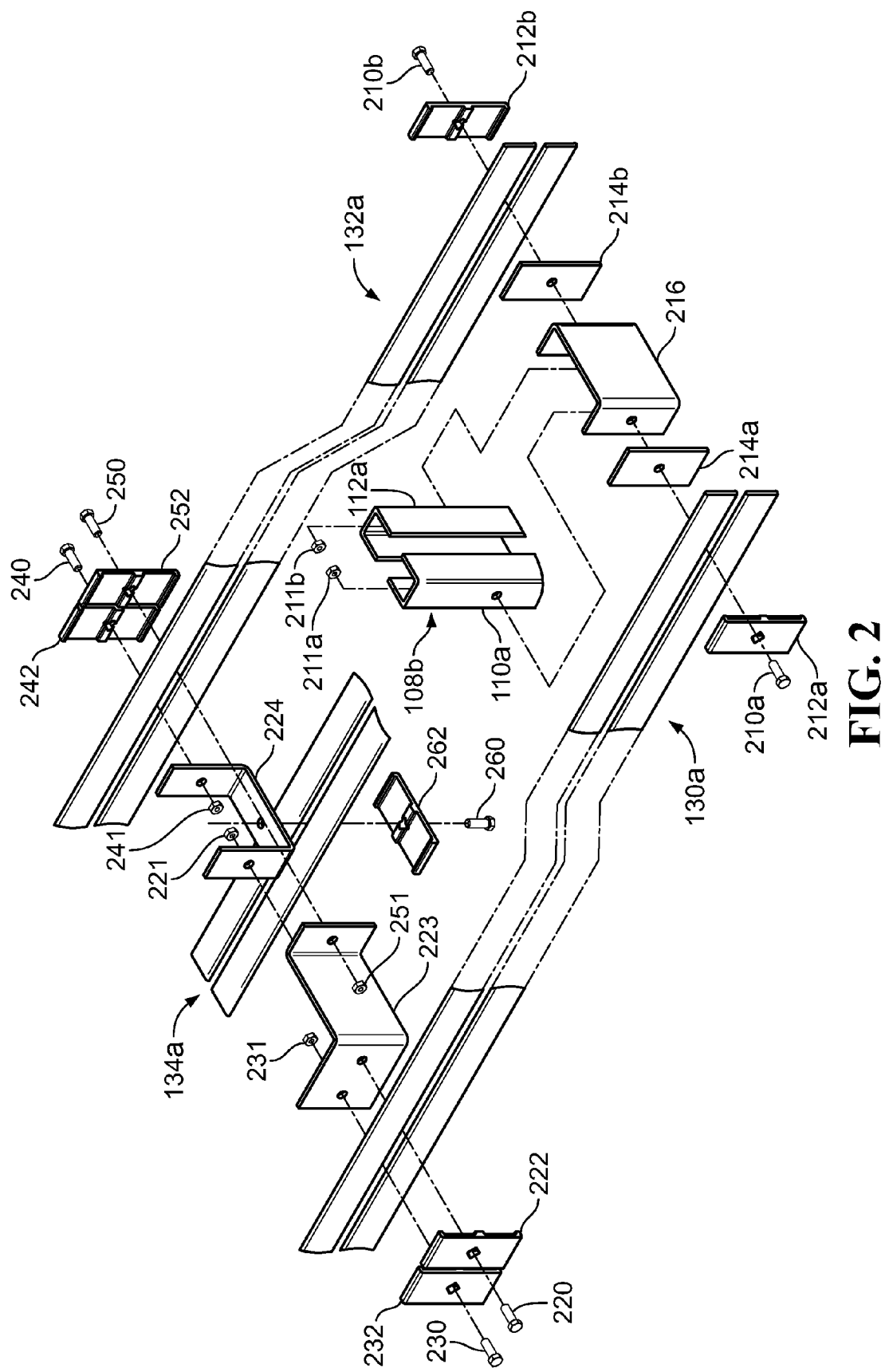
FIG. 2 is an exploded view of a portion of the bus system of FIG. 1.

An isometric view of a bus system 100 for use in electrical distribution equipment such as switchgear, switchboards, and motor control centers, is shown in FIG. 1. FIG. 2 shows a portion of the bus system 100 in exploded view. In an exemplary embodiment, the bus system 100 includes three horizontal phase conductors or buses 102a,b,c, one for each phase of a polyphase alternating current distributed by the electrical distribution equipment (not shown). The bus system 100 further includes a bus 102d corresponding to a neutral conductor. The buses 102 are made of a conductive material such as copper, aluminum, etc. The buses 102 are connected to vertical non-conductive supports 108a,b. In an exemplary embodiment, the vertical non-conductive supports are formed from a non-conductive material such as a fiberglass-reinforced polyester insulating material sold under the trade name GLASTIC. In the illustrated embodiment, the first vertical non-conductive support 108a includes first and second channel-shaped members 110a, 112a with open sides of the channels facing each other. Likewise, the second vertical non-conductive support 108b includes first and second channel-shaped members 110b, 112b with open sides of the channels facing each other. In the illustrated embodiment, the supports 108 have conductors arranged on a front side of the supports 108 (as viewed in FIG. 1) and on a rear side of the supports 108, as well as conductors supported in-between the front-side and rear-side conductors, as explained more fully hereinafter.

Figure 3:
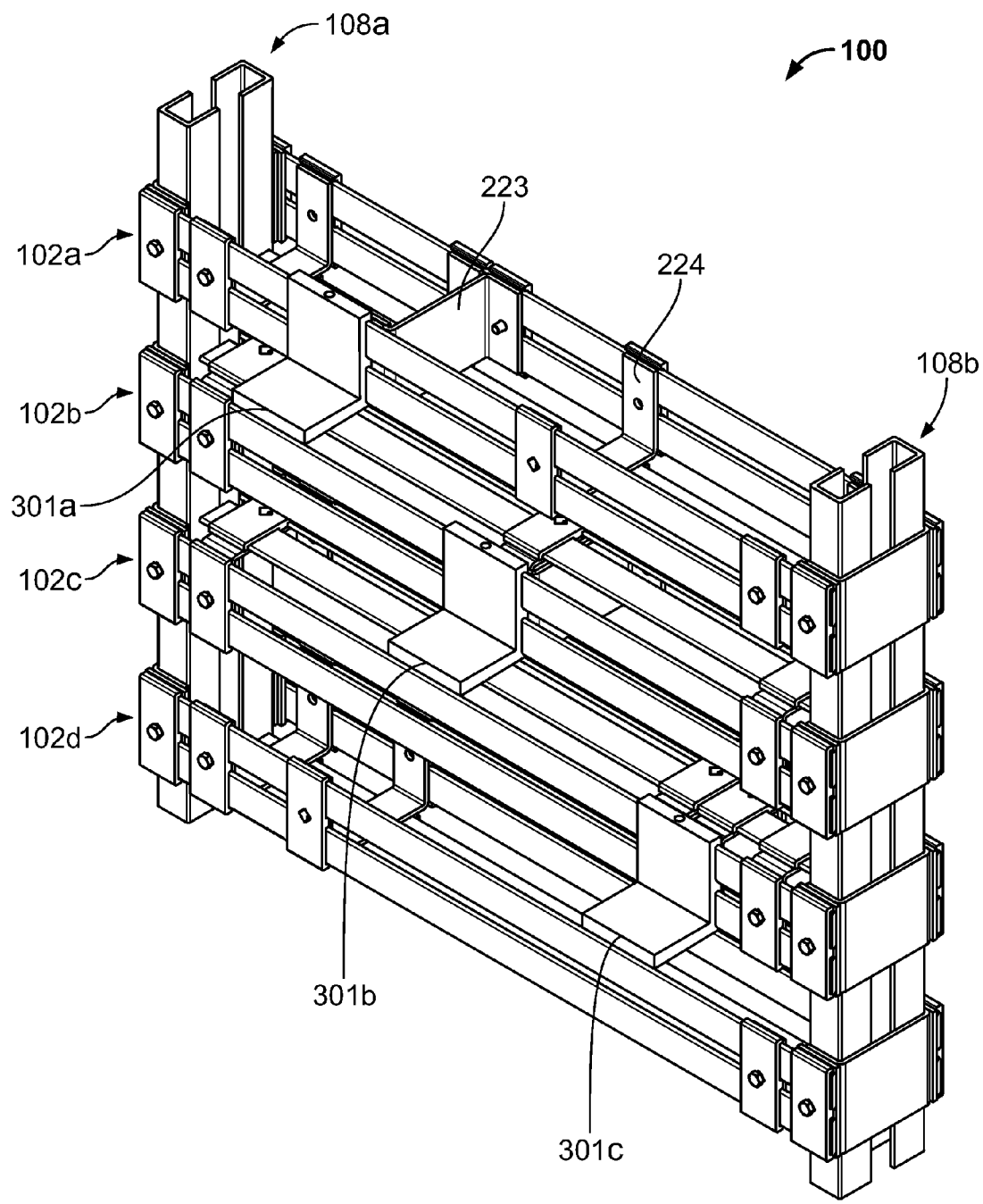
FIG. 3 is an isometric view of a bus system like that of FIG. 1 showing terminal connectors.

A bus system like that of FIG. 1 is shown in FIG. 3, in which terminal connections 301a, 301b and 301c are illustrated. Equipment to be supplied power is connected to the terminal connections. The width of the bus system may vary, and multiple bus systems may be connected side by side, in the same cabinet or adjoining cabinets, for example. To join one bus system to another bus system, for example, the conductors arranged on the front side of the supports 108 and on the rear side of the supports 108 may be extended beyond the supports 108, allowing the bus systems to be readily connected to one another. Similarly, to supply power to a stand alone bus system or to a first bus system in a series of connected bus systems, the conductors arranged on the front side of the supports 108 and on the rear side of the supports 108 may be extended beyond the supports 108, allowing power supply lines to be readily connected. In an exemplary embodiment, other "transverse" conductors, described in greater detail below, are not used to make interconnections between bus systems, since extending these conductors would encounter interference of the supports 108.

Referring to FIGS. 4A and 4B showing a cross section of the bus structure of FIG. 1 and FIG. 3, in the illustrated embodiment, the first horizontal bus 102a includes a first pair of horizontal conductors 130a, a second pair of horizontal conductors 132a, and a third pair of horizontal conductors 134a. Likewise, the second horizontal bus 102b includes a first pair of horizontal conductors 130b, a second pair of horizontal conductors 132b, and a third pair of horizontal conductors 134b, and the third horizontal bus 102c includes a first pair of horizontal conductors 130c, a second pair of horizontal conductors 132c, and a third pair of horizontal conductors 132c. The fourth horizontal bus 102d (corresponding to a neutral conductor, for example), may be of the same construction, including a first pair of horizontal conductors 130d, a second pair of horizontal conductors 132d, and a third pair of horizontal conductors 134d.

In one embodiment, of the three pairs of horizontal conductors comprising a bus, horizontal conductors of two of the pairs (e.g., pairs 130a and 132a) lie in planes that are generally parallel with respect to one another. The third pair of horizontal conductors (e.g., 134a) lies in a plane that is generally orthogonal to the planes of the other two pairs of conductors. Together, the three pairs of conductors form a substantially U-shaped bus. The conductors 130, the conductors 132, and the conductors 134, may be regarded as "front" conductors, "rear" conductors, and "middle" conductors, respectively. Alternatively, the conductors 130, the conductors 132, and the conductors 134, may be regarded as "first" conductors, "opposing" conductors, and "transverse" conductors, respectively.

Referring in particular to FIG. 4B, an important aspect of the present disclosure is the presence of an air gap between the conductor pairs of the buses described herein. The first horizontal bus 102a includes a first conductor pair 130a having a gap 130a-0 between the first horizontal conductor 130a-1 and the second horizontal conductor 130a-2, respectively. The other conductor pairs 132a and 134a include similar gaps 132a-0 and 134a-0, respectively, between the conductors 132a-1, 132a-2 and 134a-1, 134a-2. Likewise, the horizontal bus 102b includes gaps 130b-0, 132b-0, and 134b-0 between the following respective conductor pairs: (130b-1, 130b-2); (132b-1, 132b-2); and (134b-1, 134b-2). The other horizontal buses 102c and 102d also include similar gaps 130c-0, 132c-0, 134c-0, 130d-0, 132d-0 and 134d-0 between their respective conductors. Referring briefly to FIG. 4A, in an exemplary embodiment, the foregoing gaps, which separate edges of respective ones of adjacent conductors have a width Wg that is several times (e.g., three times or more) less than a width of Wc of the conductors Referring again to FIG. 4B, additional gaps are provided at the corners of the U-shaped buses, as follows: (135a, 135a'); (135b, 135b'); (135c, 135c'); and (135d, 135d').

All of the gaps enumerated above allow air to vent across the inner surfaces of the conductors. Hot air is allowed to rise by convection up through the conductors and is allowed to escape through the gaps, resulting in air exchange between the inner surfaces of the conductors and air external to the conductors. As the length of the conductors increases, an increasingly greater amount of heat is generated by alternating current having very high amperage (above 2000 amps), producing hotspots, increasing resistance and decreasing overall efficiency. The gaps reduce this heat, resulting in improved thermal dissipation. The optimum size of the gaps can be calculated by conventional boundary layer techniques. The gaps 134, 135 and 135', respectively, are aligned in the vertical direction. As a result, heated air rising due to convection passes upwardly through the bus system relatively unhindered. Again, this arrangement greatly improves thermal dissipation and avoids the need to add additional copper to compensate for the increased temperatures. As a result, the same current rating (also called "ampacity") associated with the conductors can be achieved with an overall reduction of copper.

Figure 5A:
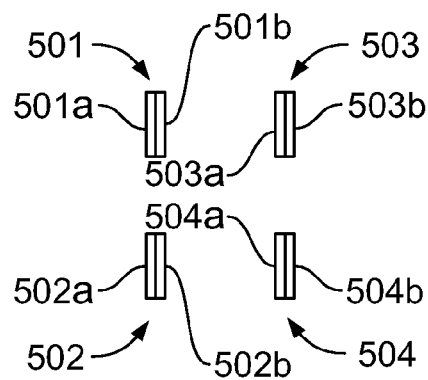
FIG. 5A and FIG. 5B are cross-sectional views of a portion of a known bus system

A significant reduction in the amount of copper needed to support the same ampacity through the buses is achieved relative to prior-art designs. For example, the buses 102a,b, c,d generally require 25% less copper compared to comparable conductor designs of the same rating. More particularly, in the known bus system of FIG. 5A, described previously, four laminated conductors with two conductors per laminate are used per bus, for a total of eight conductors per bus (i.e., conducting phase). In the bus system of FIG. 1, by contrast, each conductor may be formed from a single conductor rather than forming a laminate. In one embodiment, a total of six such conductors (instead of eight) are used per bus (i.e., conducting phase), resulting in a 25% materials savings per bus.

At the same time as the material volume of the buses is decreased, the surface area of the buses in increased by the addition of the middle, i.e., traverse, conductors 134. The exposure of more surface area improves the cooling efficiency by natural convection of the conductors. By providing gaps between the conductors, air is enabled to flow between the gaps and is not trapped inside the buses. The overall temperature of the conductors decreases, which increases the efficiency of the conductors.

In the bus system shown in FIG. 1, the buses 102 are U-shaped. Each bus may be arranged with the closed, or bight, portion of the U facing upward or with the closed portion of the U facing downward. By strategically choosing which ones of the buses 102 have the closed portion of the U facing upward and which buses have the closed portion of the U facing downward, proximity effects may be mitigated.

Figure 5B:
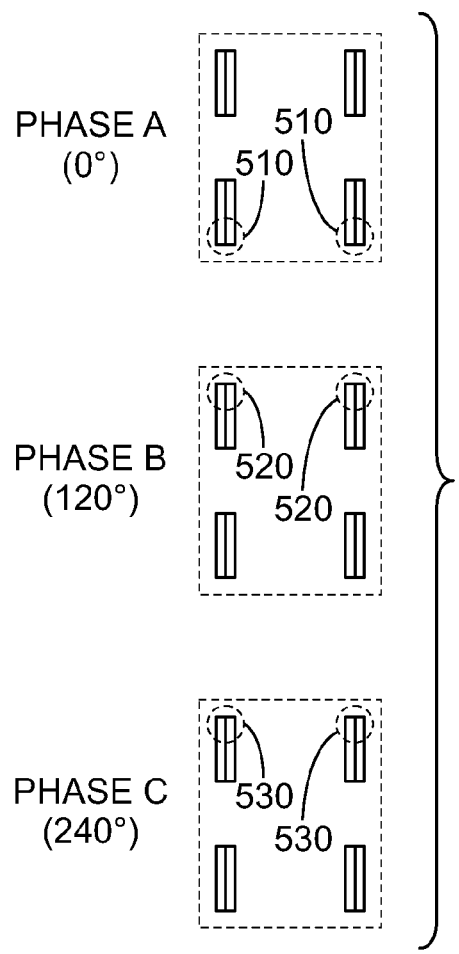

In one embodiment, adjacent phase conductors of active phases (as opposed to neutral, for example) are arranged so that the conductor pairs 134a, 134b, 134c that form the closed part of the U of the respective buses are situated where current density would otherwise be highest absent the conductor pairs 134a, 134b, 134c. As illustrated in FIG. 5B, in a typical three-phase system, because of the phase relationships between the phase conductors, proximity effects would ordinarily increase current density at the bottom of the phase conductor of phase A in an area 510 and would increase current density at the top of the phase conductors of phases B and C in areas 520 and 530, respectively. Hence, in an exemplary embodiment of the present bus system, as illustrated in FIG. 4A for example, the bus 102a is arranged with the closed portion of the U facing down; buses 102b and 102c are arranged with the closed portion of the U facing up. That is, the conductors 134 of FIG. 4A are placed at the top or bottom of a particular phase in correspondence to the areas of highest current density 510, 520, 530 in the prior art bus system. In this manner, the greatest beneficial effect is obtained from the conductors 134 and proximity effects are mitigated, increasing the overall efficiency of the buses 102 by promoting a more uniform and symmetrical current density through the conductors.

FIG. 2 shows an exploded view of a portion of the conductor system of FIG. 1. In the views of FIG. 1 and FIG. 2, the conductors 130a are referred to as front conductors and the conductors 132a are referred to as rear conductors. FIG. 2 illustrates a subset of the structure of FIG. 1 sufficient to show at least one example of each type of connection used. For example, only the right-hand support 108b of FIG. 1 is shown in FIG. 2. In general, E-shaped connectors (such as E-shaped connector 222) are used to engage and secure pairs of conductors and to hold the conductors in gapped relation to one another. As will presently be described, a bolt passes through the center of each E-connector and through the gap between the conductors secured by the E-connector. Various connecting elements are provided whereby the conductors are secured to one another and to the support assemblies 108.

More particularly with reference to FIG. 2, beginning at the front right, a bolt 210a passes through holes in an E-connector 212a, a bushing 214a, a collar 216, and lastly through the support member 110a, and is secured by a nut 211a. Similarly, at the right rear, a bolt 210b passes through holes in an E-connector 212b, a bushing 214b, the collar 216, and lastly through the support member 112a, and is secured by a nut 211b. In this manner, the conductor pairs 130a and 132a are secured to the support 108b. Toward the left-hand side, in the front a bolt 220 passes through an E-shaped connector 222, an S-shaped bracket 223 and a U-shaped bracket 224 and is secured by a nut 221. A bolt 230 passes through an E-shaped connector 232 and the S-shaped spacer 222 and is secured by a nut 231. In the rear, a bolt 240 passes through an E-shaped connector 242 and the U-shaped bracket 224 and is secured by a nut 241. A bolt 250 passes through an E-shaped connector 252 and the S-shaped bracket 223 and is secured by a nut 251. Finally, between the front and the rear connectors is provided an E-shaped connector 262. A bolt 260 passes through the E-shaped connector 262 and through the U-shaped bracket 224 and is secured by a nut (not shown).

The S-shaped bracket 223 provides conductivity between the front and rear conductor pairs 130a and 132a. The U-shaped bracket 224 provides conductivity between the resulting structure and the third conductor pair 134a. For electrical purposes, the S and U-shaped brackets 223 and 224 will typically be used together. The U-shaped bracket 224 may also be used separately, especially for purposes of mechanical reinforcement. Such reinforcement may be particularly needed in the case of long conductor runs, for example, and protects against deformation forces that may arise during a fault condition as a result of extreme currents and resulting magnetic forces.

In the bus system of FIGS. 1 and 2, front and rear conductors (for example, in the case of the bus 102a, conductors 130a-1, 130a-2, 132a-1 and 132a-2) may be the same or similar as corresponding conductors of prior bus systems in terms of width and arrangement. Substantial compatibility with prior bus systems may therefore be assured.

The conductor system 100 shown in the figures is for distribution of three-phase current, but in other aspects, the conductors disclosed herein can be used in single-phase distribution systems. Furthermore, although the support members or assemblies in the bus system of FIG. 1 are non-conductive, a similar bus arrangement may be used in instances where horizontal and vertical conductive buses are joined together.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A bus assembly for electrical power distribution, comprising:
    a first support;
    a second support;
    a plurality of generally U-shaped buses each for connecting to a respective phase of a multi-phase power system, each bus comprising:
    a first pair of substantially co-planar first elongated conductors having first ends thereof supported by the first support and second ends thereof supported by the second support, said first elongated conductors having opposed longitudinal edges that are spaced apart from each other;
    a second pair of substantially co-planar opposing elongated conductors having first ends thereof supported by the first support and second ends thereof supported by the second support such that said opposing elongated conductors, at both the first ends thereof and the second ends thereof, are spaced apart from and facing said first elongated conductors so as to form parallel legs of said U shape, said opposing elongated conductors having opposed longitudinal edges that are spaced apart from each other;
    a third pair of substantially co-planar transverse elongated conductors situated transversely between said first and second pairs of elongated conductors so as to form a bight end of said U shape, said transverse elongated conductors having opposed longitudinal edges that are spaced apart from each other; and
    a connector for electrically connecting said first, second and third pairs of elongated conductors.

2. The bus assembly of claim 1, wherein said elongated conductors are substantially flat conductors.

3. The bus assembly of claim 2, wherein said connector is U-shaped and an open end of the U-shaped connector faces in opposite directions for different ones of the buses.

4. The bus assembly of claim 1, comprising a plurality of said first elongated conductors, edges of respective ones of the plurality of first elongated conductors being separated by a gap having a width that is several times less than a width of at least one of the plurality of first elongated conductors.

5. The bus assembly of claim 4, comprising a plurality of said opposing elongated conductors, edges of respective ones of the plurality of opposing elongated conductors being separated by a gap having a width that is several times less than a width of at least one of the plurality of opposing elongated conductors.

6. The bus assembly of claim 5, comprising a plurality of said transverse elongated conductors, edges of respective ones of the plurality of additional elongated conductors being separated by a gap having a width that is several times less than a width of at least one of the plurality of transverse elongated conductors.

7. The bus assembly of claim 6, wherein each of the first support and the second support comprises two channel-shaped members held in fixed relation to one another.

8. The bus assembly of claim 7, wherein the two channel-shaped members are held with channels of the channel-shaped members facing one another.

9. The bus assembly of claim 1 in which said third pair of conductors is spaced from said first and second pair of conductors.

10. A bus assembly for electrical power distribution, comprising:
    a first support having a front side and a back side;
    a second support having a front side and a back side;
    a plurality of generally U-shaped buses each for connecting to a respective phase of a multi-phase power system, each bus comprising
    a first pair of substantially co-planar first elongated conductors having first ends thereof supported by the first support and second ends thereof supported by the second support, said first elongated conductors having opposed longitudinal edges that are spaced apart from each other;
    a second pair of substantially co-planar opposing elongated conductors having first ends thereof supported by the first support and second ends thereof supported by the second support such that said opposing elongated conductors, at both the first ends thereof and the second ends thereof, are spaced apart from and facing said first elongated conductors so as to form parallel legs of said U shape, said opposing elongated conductors having opposed longitudinal edges that are spaced apart from each other;
    a third pair of substantially co-planar transverse elongated conductors situated transversely between said first and second pairs of elongated conductors so as to form a bight end of said U shape, said transverse elongated conductors having opposed longitudinal edges that are spaced apart from each other;
    wherein said elongated conductors are all single, non-laminate conductors.

11. The bus assembly of claim 10, which includes at least one U-shaped connector for electrically connecting said first, second and third pairs of elongated conductors.

12. The bus assembly of claim 10, wherein said opposed longitudinal edges of said first elongated conductors are separated by a gap having a width that is several times less than a width of at least one of the first plurality of conductors.

13. The bus assembly of claim 12, wherein said opposed longitudinal edges of said second elongated conductors are separated by a gap having a width that is several times less than a width of at least one of the first plurality of conductors.

14. The bus assembly of claim 13, wherein said opposed longitudinal edges of said third elongated conductors are separated by a gap having a width that is several times less than a width of at least one of the first plurality of conductors.

15. The bus assembly of claim 14, wherein each of the first support and the second support comprises two channel-shaped members held in fixed relation to one another.

16. The bus assembly of claim 15, wherein the two channel-shaped members are held with channels of the channel-shaped members facing one another.

17. A bus assembly for electrical power distribution, comprising:
    a first support having a front side and a back side;
    a second support having a front side and a back side; and
    a plurality of generally U-shaped buses each for connecting to a respective phase of a multi-phase power system, each bus comprising:
    a first pair of substantially co-planar first elongated conductors having first ends thereof supported by the first support and second ends thereof supported by the second support, said first elongated conductors having opposed longitudinal edges that are spaced apart from each other;
    a second pair of substantially co-planar opposing elongated conductors having first ends thereof supported by the first support and second ends thereof supported by the second support such that said opposing elongated conductors, at both the first ends thereof and the second ends thereof, are spaced apart from and facing said first elongated conductors so as to form parallel legs of said U shape, said opposing elongated conductors having opposed longitudinal edges that are spaced apart from each other;
    a third pair of substantially co-planar transverse elongated conductors situated transversely between said first and second pairs of elongated conductors so as to form a bight end of said U shape, said transverse elongated conductors having opposed longitudinal edges that are spaced apart from each other; and
    at least one U-shaped connector for electrically connecting each elongated conductor in said third pair to at least one of the elongated conductors in each of said first and second pairs.

18. The bus assembly of claim 17, wherein an open end of the U-shaped connector faces in opposite directions for different ones of the buses.

19. The bus assembly of claim 18, wherein each of the first support and the second support comprises two channel-shaped members held in fixed relation to one another.

20. The bus assembly of claim 19, wherein the two channel-shaped members are held with channels of the channel-shaped members facing one another.

* * * * *